United States Patent
Kitaev

[11] 3,839,666
[45] Oct. 1, 1974

[54] POLYPHASE HIGH VOLTAGE INVERTER

[76] Inventor: Gennady Ivanovich Kitaev, Ulitsa Pobedy, 18, kv. 9, Sverdlovsk, U.S.S.R.

[22] Filed: Feb. 12, 1973

[21] Appl. No.: 331,361

Related U.S. Application Data

[63] Continuation of Ser. No. 237,084, March 22, 1972, abandoned.

[30] Foreign Application Priority Data
Apr. 26, 1971 U.S.S.R. .............................. 1646216

[52] U.S. Cl. .................................. 321/5, 321/45 C
[51] Int. Cl. ............................................ H02m 7/52
[58] Field of Search ............. 321/5, 15, 45 R, 45 C, 321/47

[56] References Cited
UNITED STATES PATENTS

| | | | |
|---|---|---|---|
| 3,327,200 | 6/1967 | Corey | 321/45 R |
| 3,399,336 | 8/1968 | Koppelmann | 321/45 R |
| 3,513,376 | 5/1970 | Hajek | 321/15 |

FOREIGN PATENTS OR APPLICATIONS

| | | | |
|---|---|---|---|
| 221,811 | 10/1968 | U.S.S.R. | 321/45 R |
| 1,193,163 | 5/1970 | Great Britain | 321/5 |
| 1,214,464 | 12/1970 | Great Britain | 321/15 |
| 1,374,324 | 8/1964 | France | 321/15 |

Primary Examiner—A. D. Pellinen
Attorney, Agent, or Firm—Holman & Stern

[57] ABSTRACT

A polyphase converter has a number of interconnected polyphase inverter stages. Extreme inverter stages connect the inverter to the d.c. circuit while intermediate inverter stages contain controlled rectifiers and capacitors connected to each other for stage transmission of charge from a higher voltage stage to a lower polyphase a.c. voltage under a corresponding mode of controlled rectifier commutation.

6 Claims, 16 Drawing Figures

POLYPHASE HIGH VOLTAGE INVERTER

This is a continuation of application Ser. No. 237,084 filed Mar. 22, 1972, now abandoned.

The present invention relates to apparatus for conversion of DC voltage into AC voltage, and vice versa, and more particularly to apparatus for conversion of high DC voltage into polyphase AC voltage and for conversion of polyphase AC voltage into high DC voltage.

Apparatus for conversion of high DC voltage into lower three-phase AC voltage and for conversion of AC three-phase voltage into higher DC voltage is known in the prior art.

This prior art apparatus comprises rectifier and invertor groups of controlled rectifiers connected according to a three-phase bridge pattern and coupled in series to a DC network, as well as capacitors connected to each stage of said controlled rectifier groups in each phase, the capacitors forming parallel branches in each phase.

When operating in the invertor mode, power is concurrently transmitted from all the stages of the invertor group into the three-phase network via said capacitors.

When operating in the rectifier mode, power is transmitted into a DC network from three-phase mains via the same capacitors and the rectifier group.

However, in this prior art apparatus the capacitors which couple the controlled rectifier groups to the three-phase network are required to withstand a considerable operational voltage which corresponds to the voltage across that stage to which a capacitor is coupled. For instance, a voltage across the final stage is equal to a high converted DC voltage. As a result, this prior art apparatus is not sufficiently reliable in operation. The presence of parallel branches of said capacitors makes difficult concurrent switching of single controlled rectifier groups, thereby affecting the stability of operation of the convertor.

SUMMARY OF THE INVENTION

It is an object of the present invention to provide an apparatus for converting DC voltage into polyphase AC voltage, and vice versa, i.e., for converting polyphase AC voltage into DC voltage, which apparatus permits to increase reliability and stability of operation of the convertor as compared to prior art apparatus of similar type.

The above object is accomplished in that a polyphase convertor with controlled rectifiers, comprises two extreme stages including at least one controlled rectifier per each phase and coupled to a DC network, at least one intermediate stage including at least two co-series connected controlled rectifiers, and capacitors adapted to be charged from said controlled rectifiers, according to the invention, the capacitors are connected in series in each phase.

It is advantageous to insert a capacitor in each phase of each intermediate stage in a closed circuit, comprising two co-series connected controlled rectifiers.

Two controlled rectifiers inserted in each of said closed circuits may be directly coupled between themselves.

Two controlled rectifiers inserted in each of said closed circuits may be coupled therebetween via a capacitor of the adjacent phase.

It is desirable to provide each controlled rectifier with at least one commutating reactor connected in series therewith.

Series connection of the capacitors coupled to an AC network simplifies circuitry and structure of the polyphase convertor according to the invention and improves its operational characteristics from the viewpoint of reliance and stability.

BRIEF DESCRIPTION OF THE DRAWINGS

Better understanding of the invention may be had from the following description of the embodiments thereof with reference to the accompanying drawings, in which.

DESCRIPTION OF PREFERRED EMBODIMENT

Figure 1:
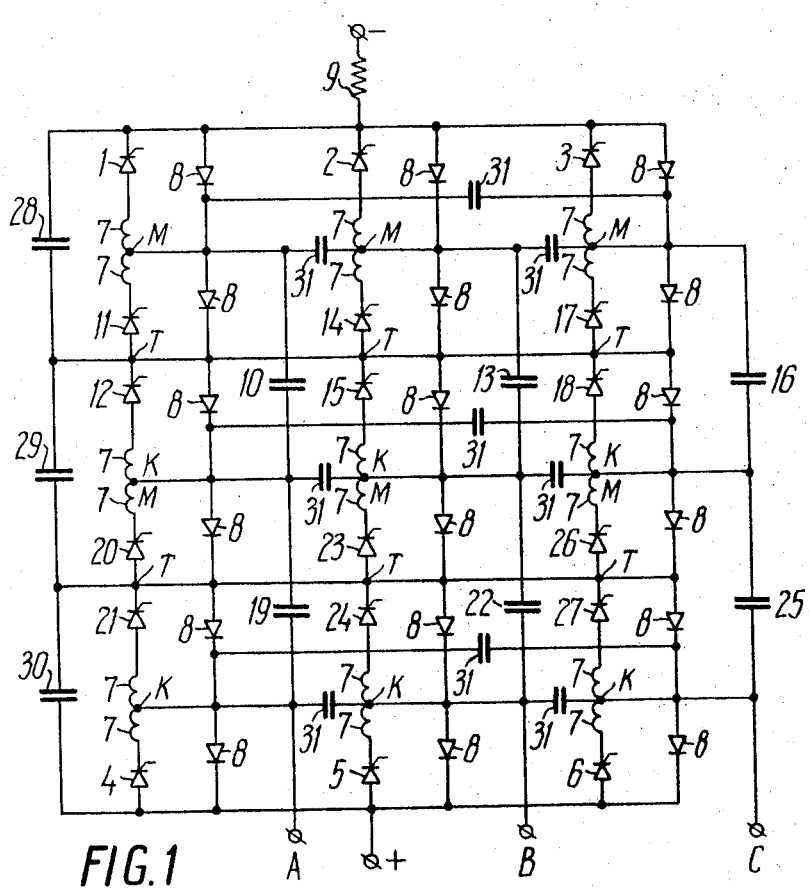
FIG. 1 shows the embodiment of a three-phase thyristor convertor, wherein two thyristors inserted in each closed circuit are directly coupled between themselves.

A three-phase convertor (FIG. 1) comprises two extreme stages. One of these extreme stages comprises thyristors 1–3, while the other comprises thyristors 4–6. Commutating reactors are connected in series with each of the thyristors 1–6. Both the above stages comprise diodes 8 shunting each of the thyristors 1–6 with the commutating reactor 7 connected in series thereto. One extreme stage, comprising the thyristors 1–3, is coupled via a filtering choke 9 to a terminal indicated at "−." The other extreme stage, comprising the thyristors 4–6, is coupled to a terminal indicated at "+."

Furthermore, this three-phase convertor comprises two intermediate stages. Each of the intermediate stages includes three closed circuits. The number of circuits in each intermediate stage is equal to the number of AC phases.

The first intermediate stage is coupled to the extreme stage coupled to the terminal "−."

Figure 2:
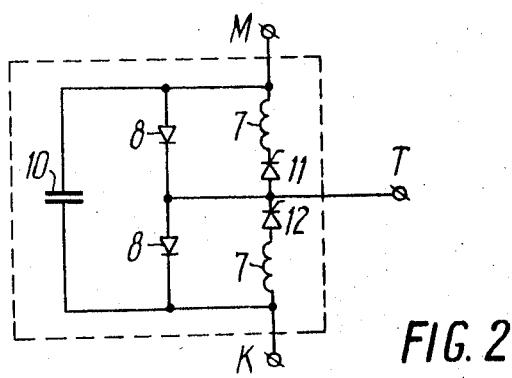
FIG. 2 shows a diagram of the closed circuit of one phase of an intermediate stage of the convertor shown in FIG. 1.

The closed circuit of the phase A of this intermediate stage (FIG. 2) comprises a capacitor 10 and two co-series connected thyristors 11, 12. The commutating reactor is connected in series to each thyristor 11, 12. Each thyristor 11, 12 with the commutating reactor connected in series thereto forms a circuit, the diode 8 being connected in parallel with the circuit.

Elements of the remaining closed circuits of the intermediate stages are connected as described above.

Closed circuits in each intermediate stage are connected in parallel therebetween by connecting similar outlets, K,M,T. Circuits in ach phase are connected in single stages by connecting opposite sign outlets K and M.

The closed circuit B (FIG. 1) of the first intermediate stage comprises a capacitor 13, two thyristors 14, 15, two commutating reactors 7 and two diodes 8.

The closed circuit C of the same intermediate stage comprises a capacitor 16, two thyristors 17, 18, two commutating reactors 7 and two diodes 8.

The second intermediate stage is coupled to the extreme stage which is coupled to the terminal "+."

The closed circuit of the phase A of the second intermediate stage comprises a capacitor 19, two thyristors 20, 21, two commutating reactors 7 and two diodes 8.

The closed circuit of the phase B of the second intermediate stage comprises a capacitor 22, two thyristors 23, 24, two commutating reactors 7 and two diodes 8.

The closed circuit C of the second intermediate stage comprises a capacitor 25, two thyristors 26, 27, two commutating reactors 7 and two diodes 8.

The three-phase convertor is coupled to an AC network through terminals indicated at A, B, C, the number of the terminals corresponding to the number of AC phases. The circuit comprising the thyristors 1, 11, 12, 20, 21, 4 and the circuit comprising the capacitors 10, 19 connected in series are coupled to the terminal A. The circuit comprising the thyristors 2, 14, 15, 23, 24, 5 and the circuit comprising the capacitors 13, 22 connected in series are coupled to the terminal B. The circuit comprising the thyristors 3, 17, 18, 26, 27, 6 and the circuit comprising the capacitors 16, 25 connected in series are coupled to the terminal C. Furthermore, the above-described three-phase convertor is divided into substages in which DC voltage is equally divided.

The first substage comprises the thyristors 1, 2, 3, 11, 14, 17, with the respective diodes 8 and commutating reactors 7.

The second sub-stage comprises the thyristors 12, 15, 18, 20, 23, 26 with the respective diodes 8 and commutating reactors 7.

The third sub-stage comprises the thyristors 21, 24, 27, 4, 5, 6 with the respective diodes 8 and commutating reactors 7.

The capacitors 10, 13, 16, 19, 22, 25 are the main capacitors functioning as capacitance accumulators taking part in the conversion process. In addition to the main capacitors 10, 13, 16, 19, 22, 25, the three-phase convertor comprises capacitors 28, 29, 30 connected to the first, second and third stages respectively. These ensure the filtering of higher harmonics in a DC network and may be also used as DC sources of a voltage which is lower than that in the DC network.

A voltage value across the capacitors 28, 29, 30 is equal to a voltage across the stage. The three-phase convertor also comprises switching capacitors 31 which couple the circuits of different phases in each stage and are used for operation of the three-phase convertor in the invertor mode.

In addition to thyristors, the controlled rectifiers may comprise mechanical circuit-breakers, electronic and ionic grid controlled means, transistors and the like.

Each capacitor in the circuit may comprise one or several members of the capacitance connected in such a manner that a total capacitance value constitute a required total capacitance.

The operation of the above-described three-phase convertor in the mode of conversion of high voltage DC into AC is divided into six cycles (FIGS. 3a, 3b, 3c, 3d, 3e, and 3f). In the general case the number of cycles in a polyphase convertor is equal to double the number of AC phases. Each cycle is characterized by switching of a certain thyristor group. The thyristors are divided into groups as follows: 1, 12, 21; 14, 23, 5; 17, 26, 6; 2, 15, 24; 11, 20, 4; and 3, 18, 27.

The thyristors operate according to a predetermined sequence. Apart from the instant of the transition from one cycle to another, during one period of alternating current only two thyristors are conductive during each of the cycles in each sub-stage of the three-phase convertor. Each thyristor conducts during one-third of the period of alternating current which corresponds to the cycles of operation of rectifiers in the three-phase bridge circuit.

During the first cycle of operation of the convertor (FIG. 3a) the thyristors 1, 12, 21 and 14, 23, 5 are conductive. Discharge current of the capacitors 13, 22 preliminarily charged during the preceding cycle, and additional charging current of the capacitors 10, 19 from the DC network flow through a load (not shown in FIG. 3a) from the terminal B to the terminal A.

Over one-sixth of the period since the instant of the beginning of the conductance of the thyristor group 1, 12, 21 the thyristors 14, 23, 5 are blocked, while the thyristors 17, 26, 6 (FIG. 3b) become conductive. At this instant the second cycle begins.

During the second cycle the capacitors 10, 19 continue to be additionally charged from the DC network, while the capacitors 16 and 25 coupled to the terminal C begin to discharge.

Figure 3A:
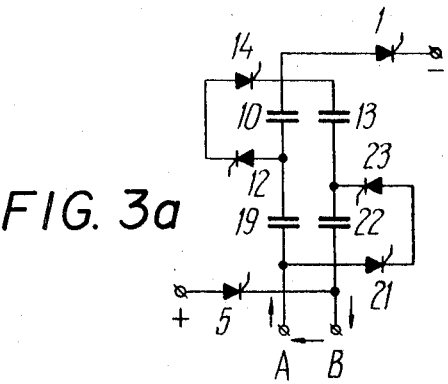
FIGS. 3a, 3b, 3c, 3d, 3e and 3f show thyristor groups with some elements of the three-phase convertor circuit shown in FIG. 1 to illustrate the cycles of operation of the circuit.
Figure 3B:
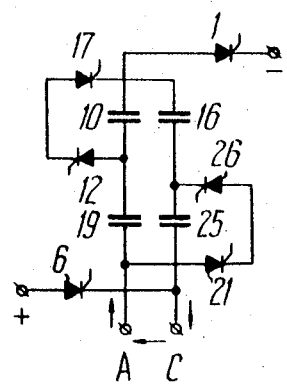

Discharge current of the capacitors 16, 25 and additional charging current of the capacitors 10, 19 are unidirectional and flow through a load (not shown in FIG. 3b) to the terminal A as in the first cycle (FIG. 3a) but this time from the terminal C (FIG. 3b).

Over one-sixth of the period since the instant of the beginning of the conductance of the thyristor group 17, 26, 6, the thyristors 1, 12, 21 are blocked, while the thyristors 2, 15, 24 (FIG. 3c) become conductive. At this instant the third cycle begins.

Figure 3C:
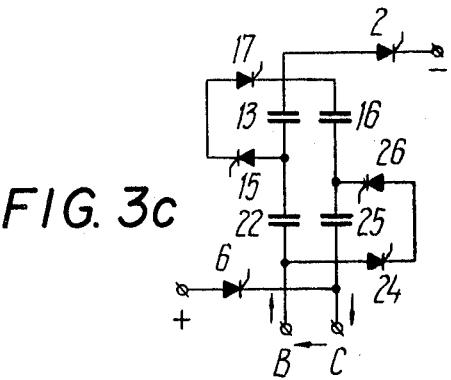

During the third cycle the capacitors 16, 25 continue to discharge, while the capacitors 13, 22 coupled to the terminal B begin to be charged from the DC network. Discharge current of the capacitors 16, 25 and additional charging current of the capacitors 13, 22 are unidirectional and flow through a load (not shown in FIG. 3c) from the terminal C similarly to the second cycle, but this time to the terminal B (FIG. 3c). Over one-sixth of the period since the instant of the beginning of the conductance of the thyristor group 2, 15, 24 the thyristors 17, 26, 6 are blocked, while the thyristors 11, 20, 4 (FIG. 3d) become conductive. At this instant the fourth cycle begins.

Figure 3D:
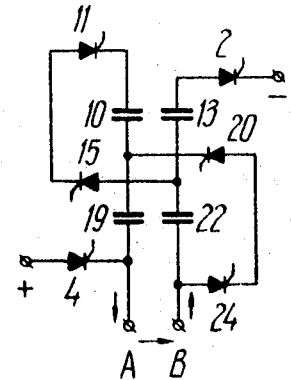

During the fourth cycle the capacitors 13, 22 continue to be additionally charged from the DC network, while the capacitors 10, 19 coupled to the terminal A begin to discharge. Discharge current of the capacitors 10, 19 and additional charging current of the capacitors 13, 22 flow through a load (not shown in FIG. 3d)

to the terminal B similarly to the third cycle (FIG. 3c), but this time from the terminal A (FIG. 3d). Over one-sixth of the period since the instant of the beginning of the conductance of the thyristor group 11, 20, 4 the thyristors 2, 15, 24 are blocked, while the thyristors 3, 18, 27 (FIG. 3e) become conductive. At this instant the fifth cycle begins.

Figure 3E:
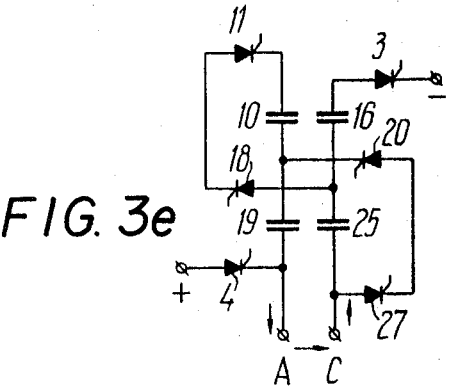

During the fifth cycle the capacitors 10, 19 continue to discharge, while the capacitors 1, 6, 25 coupled to the terminal C begin to be additionally charged from the DC network. Discharge current of the capacitors 10, 19 and additional charging current of the capacitors 16, 25 are unidirectional and flow through a load (not shown in FIG. 3e) from the terminal A similarly to the fourth cycle (FIG. 3d), but this time to the terminal C (FIG. 3e). Over one-sixth of the period since the instant of the beginning of the conductance of the thyristor group 3, 18, 27 the thyristors 11, 20, 4 are blocked, while the thyristors 14, 23, 5 (FIG. 3f) become conductive. At this instant the sixth cycle begins.

Figure 3F:
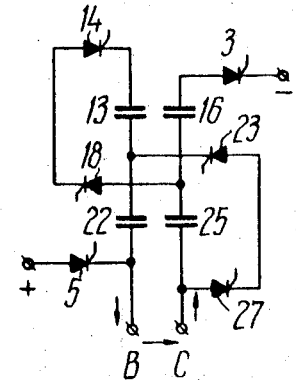

During the sixth cycle the capacitors 16, 25 continue to be additionally charged, while the capacitors 13, 22 coupled to the terminal B begin to discharge. Discharge current of the capacitors 13, 22 and additional charging current of the capacitors 16, 25 are unidirectional and flow through a load (not shown in FIG. 3f) to the terminal C similarly to the fifth cycle (FIG. 3e), but this time from the terminal B (FIG. 3f). Over one-sixth of the period since the instant of the beginning of the conductance of the thyristor group 14, 23, 5 the thyristors 3, 18, 27 are blocked, while the thyristors 1, 12, 21 (FIG. 3a) become conductive. Beginning with this instant the above-described cycles are repeated.

The division of high voltage between the sub-stages makes it possible to use the thyristors each having operating voltage equal to that of one sub-stage, AC mains may be coupled to any sub-stage, but generally it is desirable to couple them to the final sub-stage which have the lowest potential with respect to the "earth."

A DC voltage value, which depends upon a number of substages and upon an operating voltage of one sub-stage, theoretically may be as high as desired.

Operating voltage of one sub-stage depends upon high-voltage characteristics of the thyristors and capacitors.

An AC mains voltage value depends upon an operating voltage of one sub-stage.

The three-phase convertor is reversible with voltage multiplication, that is, when supplying from AC mains, a higher DC voltage appears at the terminals "+" and "−."

In the case where diodes are not used, the DC voltage polarity is opposite to that taking place during the conversion of DC voltage into AC voltage, that is, negative potential is at the terminal "+," while positive potential is at the terminal "−." The diodes connected in parallel with each circuit formed by a thyristor with the commutating reactor in series to the thyristor ensure with the blocked thyristors the possibility of the inverted conversion with the appearance at the terminals "+" and "−" of the voltage of the same polarity as during the conversion of DC voltage into AC voltage.

Furthermore, said diodes make it possible to improve stability of operation of the convertor in the mode of conversion of high DC voltage into lower AC voltage, as well as to increase the efficiency of the conversion process.

In another embodiment the three-phase convertor (FIG. 4) comprises at least two extreme stages and three intermediate stages.

Figure 4:
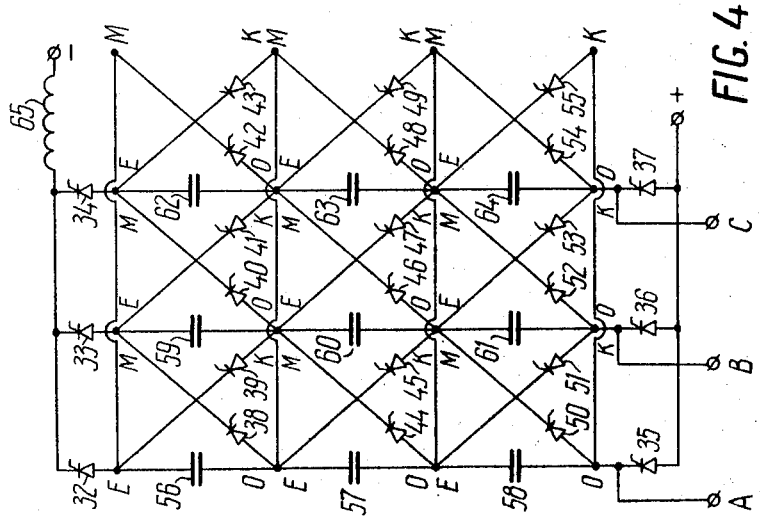
FIG. 4 shows the embodiment of the three-phase thyristor convertor, wherein two thyristors inserted in each closed circuit are coupled therebetween via a capacitor of the adjacent phase.

For the sake of simplicity FIG. 4 shows only principal elements of the three-phase convertor — thyristors 32–55 and capacitors 56–64 coupled to an AC network.

The three-phase convertor is connected to a DC network as in the first embodiment by means of the two extreme stages. One extreme stage comprises the thyristors 32–34 connected via a filtering choke 65 to a terminal indicated at "−." The other extreme stage comprises the thyristors 35–37 connected to a terminal indicated at "−."

The three-phase convertor is connected to the AC network by means of terminals A, B, C, a number of the terminals corresponding to a number of AC phases. The phase A is associated with a circuit of series connected capacitors 56–58 and the thyristors 32, 35. The phase B is associated with a circuit of series connected capacitors 59–61 and the thyristors 33, 36. The phase C is associated with a circuit of series connected capacitors 62–64 and the thyristors 34, 37.

Each of the three intermediate stages comprises three closed circuits. The number of circuits in each intermediate stage corresponds to a number of AC phases.

Reference is now made to the intermediate stage connected to the extreme stage which is coupled to the terminal "−."

The closed circuit of the phase A in this intermediate stage comprises the capacitor 56 and the two thyristors 38, 39 which are co-series connected therebetween via a capacitor 59 of the adjacent phase B.

The closed circuit of the phase B of the same intermediate stage comprises the capacitor 59, and the two thyristors 40, 41 co-series connected therebetween via a capacitor 62 of the adjacent phase C.

The closed circuit C in the same intermediate stage comprises the capacitor 62 and the two thyristors 42, 43 co-series connected therebetween via the capacitor 56 of the adjacent phase A.

The connection of the elements of the closed circuits of the remaining intermediate stages is similar to that described above.

The closed circuit of the phase A of the middle intermediate stage comprises the capacitor 57 and the two thyristors 44, 45. The closed circuit of the phase B of this stage comprises the capacitor 60 and the two thyristors 46, 47.

The closed circuit of the phase C of the same stage comprises the capacitor 63 and the two thyristors 48, 49.

The third intermediate stage is connected to the extreme stage which is coupled to the terminal "+."

The closed circuit of the phase A of this intermediate stage comprises the capacitor 58 and the two thyristors 50, 51. The closed circuit of the phase B of the same intermediate stage comprises the capacitor 61 and the two thyristors 52, 53. The closed circuit of the phase C of the same intermediate stage comprises the capacitor 64 and the two thyristors 54, 55.

Figure 5:
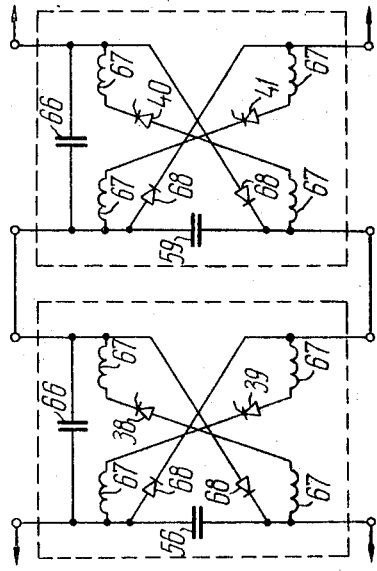
FIG. 5 shows a diagram of coupling between two closed circuits of the adjacent phases of an intermediate stage of the three-phase convertor shown in FIG. 4.

FIG. 5 is a more detailed illustration of two circuits of the adjacent phases A, B of the intermediate stage connected to the extreme stage which is coupled to the terminal "−."

In each of the circuits of FIG. 5 there are inserted switching capacitors 66 and commutating reactors 67. Each thyristor 38, 39, 40, 41 with the two commutating reactors 67 connected in series thereto forms a circuit having a diode 68 in parallel therewith. The diodes 68 improve the switching of the thyristors 38, 39, 40, 41 and ensure the possibility of the inverted conversion of AC voltage into DC voltage with blocked thyristors.

The connection of the two capacitors of the adjacent phases via two thyristors makes it possible to reduce by two times the thyristor load current.

As in the three-phase convertor of the first embodiment, controlled rectifiers may comprise, in addition to thyristors, mechanical circuit-breakers, electronic and ionic grid controlled, means, transistors and the like.

Each capacitor, as in the first embodiment, may comprise one or several members of the capacitance which are connected in such a manner that a total capacitance value is equal to a required capacitance.

The operation of the three-phase convertor in the mode of conversion of high voltage DC into AC is divided into six cycles (FIGS. 6a, 6b, 6c, 6d, 6e and 6f).

In a general case a number of cycles in a polyphase convertor is equal to double the number of AC phases.

Each cycle is characterized by switching of a predetermined group of thyristors. A number of groups is six. The thyristors are divided into the groups as follows: 32, 38, 40, 42, 36; 32, 51, 53, 55, 37; 33, 44, 46, 48, 37; 33, 39, 41, 43, 35; 34, 50, 52, 54, 35; 34, 45, 47, 49, 36.

The thyristors operate according to a predetermined sequence.

Apart from the instant of the transition from one cycle to another, each thyristor in the intermediate stages is conductive during one-sixth of the period, while the thyristors coupled with the DC network are conductive during one-third of the AC period.

Figure 6A:
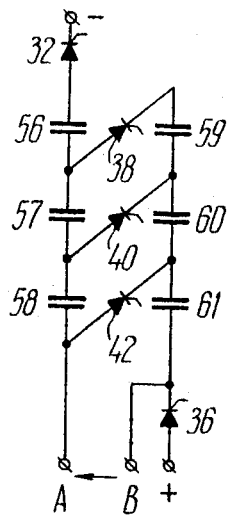
FIGS. 6a, 6b, 6c, 6d, 6e and 6f show thyristor groups with some elements of the three-phase convertor shown in FIG. 4 to illustrate cycles of operation of the circuit.
Figure 6B:
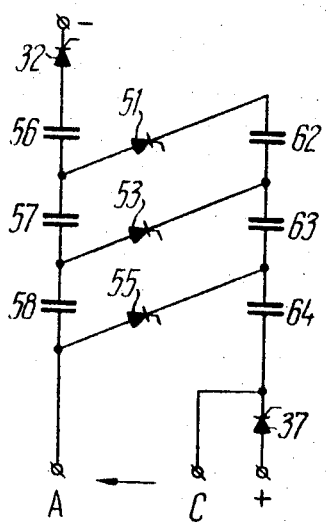

During the first cycle of the operation of the convertor (FIG. 6a) the thyristors 32, 28, 40, 42, 46, 36 are conductive. Discharge current of the capacitors 59, 60, 61 preliminarly charged during the preceding cycle, and additional charging current of the capacitors 56, 57, 58 from the DC network flow through a load (not shown in FIG. 6a) from the terminal B to the terminal A. Over one-sixth of the period since the instant of the beginning of the conductance of the thyristors 32, 28, 40, 42, 36, the thyristors 38, 40, 42, 36 are blocked, while the thyristors 51, 53, 55, 37 become conductive (FIG. 6b). At this instant the second cycle begins. During the second cycle the capacitors 56, 57, 58 continue to be additionally charged, while the capacitors 62, 63, 64 connected to the terminal C begin to discharge. Additional charging current of the capacitors 56, 57, 58 and discharge current of the capacitors 62, 63, 64 are unidirectional and flow through a load (not shown in FIG. 6b) to the terminal A as in the first cycle, but this time from the terminal C (FIG. 6b). Over one-sixth of the period since the instant of the beginning of the conductance of the thyristors 51, 53, 55, 37 the thyristors 32, 51, 53, 55 are blocked, while the thyristors 33, 44, 46, 48 (FIG. 6c) become conductive. At this instant the third cycle begins.

Figure 6C:
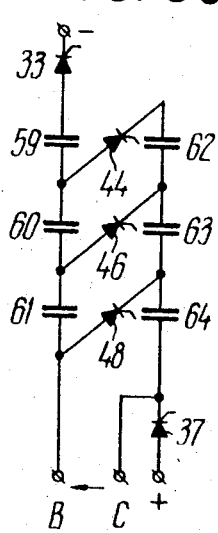
Figure 6D:
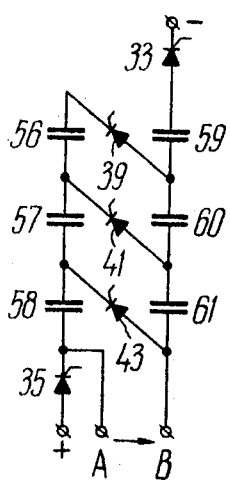

During the third cycle the capacitors 62, 63, 64 continue to discharge, while the capacitors 59, 60, 61 connected to the terminal B begin to be additionally charged from the DC network. Discharge current of the capacitors 62, 63, 64 and additional charging current of the capacitors 59, 60, 61 are unidirectional and flow through a load (not shown in FIG. 6c) from the terminal C as in the second cycle (FIG. 6b), but this time to the terminal B (FIG. 6c). Over one-sixth of the period since the beginning of the conductance of the thyristors 33, 44, 46, 48 the thyristors 44, 46, 48, 37 are blocked and the thyristors 39, 41, 43, 35 become conductive (FIG. 6d). At this instant the fourth cycle begins.

During the fourth cycle the capacitors 59, 60, 61 continue to be additionally charged from the DC network, while the capacitors 56, 57, 58 connected to the terminal A begin to discharge. Additional charging current of the capacitors 59, 60, 61 and discharge current of the capacitors 56, 57, 58 are unidirectional and flow through a load (not shown in FIG. 6d) to the terminal B as in the third cycle (FIG. 6c), but this time from the terminal A (FIG. 6d). Over one-sixth of the period since the instant of the beginning of the conductance of the thyristors 39, 41, 43, 35 the thyristors 33, 39, 41, 43 are blocked, while the thyristors 34, 50, 52, 54 become conductive (FIG. 6d). At this instant the fifth cycle begins.

Figure 6E:
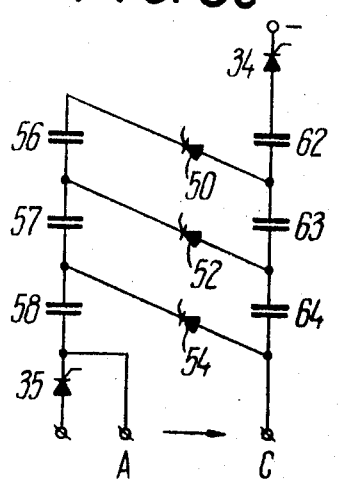
Figure 6F:
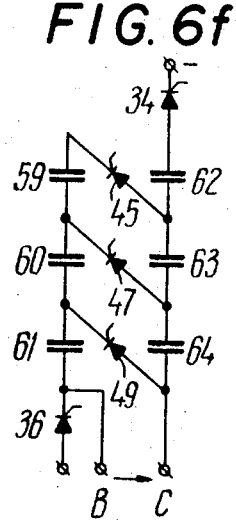

During the fifth cycle the capacitors 56, 57, 58 continue to discharge, while the capacitors 62, 63, 64 connected to the terminal C begin to be additionally charged from the DC network. Discharge current of the capacitors 56, 57, 58 and additional charging current of the capacitors 62, 63, 64 are unidirectional and flow through a load (not shown in FIG. 6e) from the terminal A as in the fourth cycle (FIG. 6d), but this time to the terminal C (FIG. 6e). Over one-sixth of the period since the instant of the beginning of the conductance of the thyristors 34, 50, 52, 54 the thyristors 50, 52, 54, 35 are blocked, while the thyristors 45, 47, 49 36 become conductive (FIG. 6f). At this instant the sixth cycle begins.

During the sixth cycle the capacitors 62, 63, 64 continue to be additionally charged from the DC network, while the capacitors 59, 60, 61 connected to the terminal B begin to discharge. Additional charging current of the capacitors 62, 63, 64 and discharge current of the capacitors 49, 60, 61 are unidirectional and flow through a load (not shown in FIG. 6f) to the terminal C as in the fifth cycle (FIG. 6e), but this time from the terminal B (FIG. 6f).

Over one-sixth of the period since the instant of the beginning of the conductance of the thyristors 45, 47, 49, 36 the thyristors 34, 45, 47, 49 are blocked, while the thyristors 32, 38, 40, 42 become conductive. Beginning with this instant all the above-described cycles are repeated.

Thus the above-described three-phase convertor ensures the production of a symmetrical three-phase current pattern in an AC network with a commonly adopted order of phase alternation.

In the third embodiment a polyphase convertor with controlled rectifiers may comprise instead of the thyristors 35–37 (FIG. 4) of the extreme stage coupled to the terminal "+", the windings of a transformer, said windings having a common point coupled to the DC network. The filtering choke 65 may be replaced by three similar chokes instead of the thyristors 32–34, respectively.

In a general case a polyphase convertor with controlled rectifiers is capable of providing the respective polyphase symmetrical AC pattern with a desired phase alternation.

Symmetrical conditions of the operation of the polyphase convertor with controlled rectifiers result in producing a a symmetrical polyphase current pattern in AC network.

Voltage waveform is symmetrical with respect to the zero line, while in a case where respective conditions are satisfied, a sinusoidal waveform may be obtained.

The conversion frequency is limited by the switching response of controlled rectifiers.

The output of the polyphase convertor with controlled rectifiers is proportional to a capacitance of the main capacitors at the conversion frequency.

The polyphase convertor with controlled rectifiers is very useful where it is necessary to take off relatively low power directly from a high voltage DC electric transmission line to satisfy both internal power distribution circuits of sub-stations of said electric transmission line and other varied loads. In this case it is expedient to use an auxiliary commercial frequency inverter supplied from the lower stage or from a rectifier coupled to the AC network of this polyphase convertor with controlled rectifiers operating at an ultimate conversion frequency of the order of 5–10 KHz.

The polyphase convertor with controlled rectifiers may find application also in other convertor apparatus employed for generation of polyphase AC current of diverse frequencies where a supply source of relatively high voltage DC is available, e.g., where the supply is effected from a DC network for electric transport vehicles.

The polyphase convertor with controlled rectifiers used as voltage multiplier may find application in relatively powerful superhigh-voltage DC supply sources, for instance in test benches, for supplying high-current accelerators and for other purposes.

What I claim is:

1. A polyphase inverter for conversion of a d.c. voltage from a d.c. circuit into a low polyphase a.c. voltage to be fed to a corresponding a.c. load circuit, said inverter having a plurality of interconnected polyphase inverter stages, each of said plurality of polyphase inverter stages having at least two extreme inverter stages and at least one intermediate inverter stage disposed therebetween, said stages being connected to the d.c. circuit for multiplying current and dividing voltage at said load, each phase of said intermediate inverter stages comprising at least one capacitor, a plurality of commutating reactors and a plurality of controlled rectifiers, each phase of said extreme inverter stages comprising a controlled rectifier, means connecting each capacitor in each phase of said intermediate inverter stages to each other and the a.c. load circuit, means connecting said commutating reactors in a series circuit with each controlled rectifier of each phase of said intermediate stages, means connecting the controlled rectifiers of each phase of said intermediate inverter stages to capacitors of different phases of adjacent interter stages to effect cascade transmission of capacitor charge, and wherein said controlled rectifier of each phase of said extreme inverter stages is connected to said d.c. circuit.

2. A polyphase inverter according to claim 6, wherein the capacitor in each phase of each intermediate stage is connected in a closed circuit across said series connection of said controlled rectifiers and said commutating reactors.

3. A polyphase inverter according to claim 2, wherein two controlled rectifiers inserted in each said closed circuit are coupled by way of direct connection.

4. A high-voltage polyphase inverter according to claim 2, wherein two controlled rectifiers of each phase are directly coupled to each other and connected in a closed circuit with the capacitor of the given phase, the closed circuit having three outlets of which two are from the capacitor and serve for series connection with the other capacitors of the same phase and wherein one outlet, coming out of the point of connection of two controlled rectifiers, is connected with analogous outlets of similar circuits of the other phases of the given intermediate stage.

5. A high-voltage polyphase inverter according to claim 2, wherein each capacitor of a phase is connected in a closed circuit with a capacitor of another phase by two controlled rectifiers, each controlled rectifier connecting opposite-sign, upper and lower outlets of two capacitors of different phases.

6. A high-voltage polyphase inverter according to claim 2, wherein each controlled rectifier of the extreme and intermediate inverter stages is series-connected in a circuit with at least one commutating reactor.

* * * * *